Patented June 11, 1940

2,203,680

UNITED STATES PATENT OFFICE 2,203,680

NITRIC ACID OXIDATION OF OLEIC AND OTHER FATTY ACIDS

Ellsworth K. Ellingboe, Wilmington, Del., assignor to E. I. du Pont de Nemours & Company, Wilmington, Del., a corporation of Delaware No Drawing. Application December 2, 1937, Serial No. 177,819

9 Claims. (Cl. 260—406)

This invention relates to the oxidation of unsaturated fatty acids; more particularly to the oxidation of unsaturated fatty acids with nitric acid and still more particularly to the nitric acid oxidation of the unsaturated fatty acids naturally occurring in animal and vegetable fats and oils.

While oleic acid has been oxidized with nitric acid, the yield where it has been stated is said to be low.

This invention has as an object an improved process for the oxidative scission of long chain unsaturated fatty acids. A further object is an improved process for the production of saturated monobasic and dibasic aliphatic acids. A still further object is an improvement in the nitric acid oxidation of certain fatty acids. Other objects will appear hereinafter.

These objects are accomplished by the following invention wherein a long chain unsaturated fatty acid, preferably oleic acid, is oxidized by highly concentrated nitric acid at ordinary temperatures in the presence of ammonium vanadate.

The more detailed practice of the invention is illustrated by the following examples, wherein parts given are by weight unless otherwise stated. There are of course many forms of the invention other than these specific embodiments.

EXAMPLE I.—*Oxidation of oleic acid*

One mol of oleic acid was added slowly with stirring to ten mols of nitric acid (88%) to which had been added 0.1% of ammonium vanadate based on the weight of the oleic acid used, the oleic acid being added at such a rate that the temperature of the mixture did not rise above 30–35° C. After the entire amount of oleic acid had been added, the mixture was stirred and kept below 35° C. by cooling until it showed no tendency to be exothermic of itself. The reaction mixture was then allowed to stand at room temperature (25–30°) without stirring for 48 hours, at the end of which time a crust of oxidation products had formed on the surface of the mixture.

*Dibasic acid product.*—The nitric acid oxidation mixture was diluted with three to four volumes of water, stirred, and heated to 95–100° C. The hot mixture, which consisted of an aqueous and an oil phase, was then allowed to separate after which the aqueous layer was drained off. The oil layer was extracted twice using each time about three volumes of water at 90–100° C., and the aqueous extracts separated from the oil. The combined hot aqueous extracts were freed of a small quantity of oil by adding decolorizing carbon and filtering hot. The clear, aqueous solution was cooled slowly to 10–0° C. The resulting crystalline precipitate was filtered, washed with cold water, and dried. The combined mother liquor and washings were concentrated to 20–25% of their original volume, cooled as before, and a further quantity of dibasic acids obtained. This concentration was repeated until no more appreciable amount of dibasic acids was obtained.

The dibasic acids obtained in the first crop (M. P. in the range 90–110° C.) contained more azelaic acid than did the subsequent crops (M. P. up to 130° C.). The total yield of dibasic acids averaged about 50% of theory, calculating the raw material as pure oleic acid and the product as 65% azelaic acid, 35% suberic acid (average molecular weight 183). The product was further purified by recrystallization from water after treatment with decolorizing carbon; M. P. about 90–110° C., neutral equivalent about 91.5–92.5 (corresponding to 65–80% azelaic acid in an azelaic-suberic mixture). The yield of dibasic acids was found to be dependent upon the quality of the oleic acid used. Ordinary U. S. P. oleic acid, which apparently contained considerable but varying quantities of saturated and doubly unsaturated fatty acids and had a composite iodine number in the range 86–94 (theory for oleic, 89.9), produced 46–52% of the theoretical amount of dibasic acids. A specially purified grade of oleic acid (Eimer and Amend C. P. oleic acid) gave 60% of the theoretical yield of dibasic acids.

The procedure found best suited for isolating the dibasic acids with a minimum of loss by degradation through contact with hot concentrated nitric acid involves carrying out the above mentioned concentration by vacuum steam distillation. By this method the nitric acid is quickly and practically completely eliminated at a moderate temperature while at the same time carrying the non-volatile product essentially to dryness for subsequent recrystallization from water. Evaporation at atmospheric or reduced pressure is more time-consuming, and moreover concentrates the nitric acid excessively in the mother liquor; this is objectionable; first, because of excessive degradations of the products and, second, because of loss in yield through greater solubility of the product in concentrated nitric acid than in water.

The nitric acid oxidation mixture may also be neutralized with potassium carbonate, evaporated to dryness and extracted with alcohol whereby the potassium salts of the acids are separated from the potassium nitrate.

*Steam distillable monobasic acids.*—The oily material which had been separated from the aqueous extracts was subjected to exhaustive steam distillation in order to isolate the saturated monobasic acids produced by the oxidation. The monobasic acids collected as a light yellow oil in the distillate, and were separated from the water to obtain the crude product. Distillation of the product under reduced pressure yielded a negligible foreshot and a distillate boiling at 75–115° C. at 2 mm. which comprises 85–90% of the whole. The distilled product had a neutral equivalent of 155–158, and was a mixture of water-insoluble monobasic saturated aliphatic acids whose principal ingredient was pelargonic acid (neutral equivalent, 158). The yield of crude monobasic acids varied from 20–57% of the theoretical calculated as pure pelargonic acid, depending upon the quality of the starting oleic acid.

*Non - steam - distillable residue.*—The non-steam-distillable residue, amounting to 30–50% by weight of the starting oleic acid, was semi-solid at room temperature and analyzed as follows: nitrogen, about 2%; iodine number, 5.0; neutral equivalent, about 240. It was apparently a mixture of nitrated products and saturated fatty acids. Upon reoxidation under the same procedure used for the original oleic acid, this residue produced 20–25% of the theoretical amount of dibasic acids (calculated as though the residue were pure oleic acid), very little steam-distillable product, and 75–90% of non-steam-distillable material which did not yield appreciable amounts of dibasic acids on further treatment with nitric acid. The residue from the original oxidation, furthermore, could be partially separated into a nitrogen-containing constituent which was a red viscous oil (N, about 4.5–5%) insoluble in petroleum ether, and a yellow pasty fraction which was soluble in petroleum ether and contained only a small amount of nitrogen.

EXAMPLE II.—*Oxidation of erucic acid*

In the case of erucic acid, where the dibasic acid produced (brassylic acid) is not soluble in water, it has been found by experience that esterification of the whole crude oxidation product and fractionation of the resulting mixed esters is a more effective method of isolating the individual products. Thus, 85 parts by weight of erucic acid was oxidized at room temperature with 159 parts by weight of 99% nitric acid (to which had been added 0.1 part by weight of ammonium vanadate) for 50 hours according to the procedure described above for oleic acid. The oxidation mixture was then stirred with 3 to 4 volumes of water and the somewhat waxy product filtered out. This waxy material was melted with fresh water, stirred, allowed to separate, cooled, and the wash water drained off. After washing a second time with fresh water by the same method the product was dissolved in 880–890 parts by weight of 10% sodium hydroxide; the alkaline solution was heated on a steam bath adding zinc dust (about 10 parts by weight) in small portions with stirring until the yellow color due to nitrated compounds had disappeared. The solution was then diluted and filtered warm. The resulting filtrate was made acid to litmus with hydrochloric acid and the resulting mixture allowed to cool. The aqueous portion, which contained reduced nitrated products in the form of soluble hydrochlorides, was drained from the solid crusted insoluble products and the latter washed twice with fresh water by the procedure previously described. The washed material was dried in a desiccator and then esterified with methanol using gaseous hydrogen chloride as the catalyst. Fractionation of this esterified product produced amounts of methyl pelargonate, B. P. 60–70° at 12 mm., equivalent to 50% of the theoretical amount, and methyl brassylate, B. P. 136–153° C. at 1½ mm., equivalent to 41% of the theoretical yield. The nitrated compounds present in the crude oxidation product were removed through reduction followed by acid extraction because if allowed to remain they tended to decompose and form undesirable impurities during the subsequent distillation.

While the above examples show the oxidation of oleic and erucic acids, the process is generically applicable to the oxidation of long chain unsaturated fatty acids, e. g., to those naturally occurring in animal and vegetable fats and oils. The invention is applicable not only to doubly bonded acids, e. g., oleic, brassidic, erucic, hypogaeic, and isooleic, etc., acids, but also to triple bonded acids, e. g., stearolic, palmitolic, tetradecylpropiolic, behenoic, etc., acids, to acids containing a plurality of multiple bonds, e. g., linoleic, eleostearic, linolenic, therapinic, arachinolonic, jecorinic, clupanodonic, etc., acids and to the structural isomers thereof, i. e., elaidic, $\beta$-eleostearic, etc. Elaidic acid is essentially equivalent to oleic acid as a raw material for nitric acid oxidation, since elaidinization of oleic acid probably occurs as a preliminary to or simultaneously with its oxidation because of the nitric acid and nitrogen oxides which are well known catalysts for this rearrangement.

The nitric acid oxidation of oleic acid and other long chain unsaturated fatty acids in the presence of a vanadium catalyst is best carried out at room temperature over a period of about 48 hours using 10 moles of fuming nitric acid per mole of oleic acid. The temperature can be varied in the range of 0–40° C. without materially affecting the results, but higher temperatures are desirable because excessive degradation of the products then occurs. The time can be increased with a slightly beneficial effect on the yields of products, but shorter time periods result in decreased yields. The nitric acid used must be strong enough to have a high solvent power for the unsaturated oleic acid and accordingly 80% or stronger nitric acid has been found necessary. The molar ratio of nitric acid: oleic acid of about 10:1 produces optimum results, although ratios of as low as 5:1 and as high as 15:1 may be used at the expense of somewhat lower yields of products. The use of ammonium vanadate as a catalyst is highly advantageous in the oixidation in that it approximately halves the time otherwise necessary to obtain the maximum yield; and only a small amount of the catalyst is needed, concentrations of 0.05–0.15% by weight of the oleic or other long chain unsaturated fatty acid being effective.

In the examples, ammonium vanadate is disclosed as the catalyst. In the presence of nitric acid this is, in all probability, converted to vanadic acid, vanadium pentoxide or vanadyl nitrate. Sodium, potassium, etc. salts behave similarly. Any vanadium compound may be employed which gives with nitric acid a vanadium pentoxide solution such as that obtained with ammonium vanadate. Such compounds are therefore comprehended by the term used in the specification and claims, "a vanadium catalyst" or "a vanadic anhydride catalyst."

This invention may be used in the production of monobasic and dibasic fatty acids from naturally occurring unsaturated oil and fat acids. The products are of importance to the organic chemical industry, e. g., as intermediates in the preparation of esters for use as plasticizers, in the preparation of alkyd resins, etc.

The process of the present invention represents a definite advance in the technique of oxidizing oleic acid with nitric acid. The prior art on this subject mentions the yields of products only to state that they were very low. The highly improved method of oxidation with fuming nitric acid at ordinary temperatures as described above has given improved yields of products, and the further use of the vanadate catalyst has resulted in the attainment of these results in only half the time otherwise necessary. Moreover, the vanadium catalyst seems to be unique in its effect because other metals such as copper, nickel, molybdenum and cobalt, when introduced into the oxidation mixture in the form of their salts appear to be ineffective, even though they are known to have catalytic activity in certain nitric acid oxidations, e. g., the use of copper salts in the oxidation of cyclohexanol as in U. S. Patent 1,960,211.

Another advantage of this invention resides in its applicability to unsaturated acids other than oleic acid. The oxidation of erucic acid, for example, has been described herein. According to the literature erucic acid, when oxidized by other procedures, must be oxidized in small portions of not more than 5–10 grams each if the best results are to be obtained (Müller, Roltz and Weiner, Ber. 67, 295 (1934)). By the method outlined in this invention, erucic acid can be oxidized on a much larger scale and with better results than previously described.

The above description and examples are intended to be illustrative only. Any modification of or variation therefrom which conforms to the spirit of the invention is intended to be included within the scope of the claims.

I claim:

1. In a process of preparing aliphatic organic carboxylic acids, the step which comprises oxidizing oleic acid with ten mols per mol of oleic acid of 88% nitric acid and 0.1% of ammonium vanadate at 25–35° C. for two days.

2. In a process of preparing aliphatic organic carboxylic acids, the step which comprises oxidizing oleic acid with 5–15 mols per mol of oleic acid of nitric acid of at least 80% concentration at 0–40° C. in the presence of a vanadium catalyst.

3. In a process of preparing aliphatic organic carboxylic acids, the step which comprises oxidizing at 0–40° C., a long chain unsaturated fatty acid with 5–15 mols, per mol of fatty acid, of nitric acid of at least 80% concentration in the presence of a vanadium catalyst.

4. In a process for the oxidation of oleic acid with nitric acid, the improvement which comprises carrying out the oxidation with the assistance of a vanadium catalyst.

5. In a process for the oxidation of a long chain unsaturated fatty acid with nitric acid, the step which comprises carrying out the oxidation with the assistance of a vanadium catalyst.

6. In a process of preparing aliphatic organic carboxylic acids, the step which comprises oxidizing a long chain unsaturated fatty acid with nitric acid of at least 80% concentration in the presence of a vanadium catalyst.

7. In a process for the oxidation of oleic acid with nitric acid of at least 80% concentration, the improvement which comprises carrying out the oxidation with the assistance of a vanadium catalyst.

8. In a process for the oxidation of a long chain unsaturated fatty acid with nitric acid of at least 80% concentration, the step which comprises carrying out the oxidation with the assistance of a vanadium catalyst.

9. In a process of preparing aliphatic organic carboxylic acids, the step which comprises oxidizing erucic acid with nitric acid of at least 80% concentration in the presence of a vanadium catalyst.

ELLSWORTH K. ELLINGBOE.

CERTIFICATE OF CORRECTION.

Patent No. 2,203,680.                                      June 11, 1940.

ELLSWORTH K. ELLINGBOE.

It is hereby certified that error appears in the printed specification of the above numbered patent requiring correction as follows: Page 2, second column, line 10, for "12 mm." read --2 mm.--; line 49, for the word "desirable" read --undesirable--; line 62, for "oixidation" read --oxidation--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.